(12) United States Patent  
Paik

(10) Patent No.: US 7,679,688 B2  
(45) Date of Patent: Mar. 16, 2010

(54) WIRELESS TV SYSTEM AND CONTROL METHOD THEREOF

(75) Inventor: Seung-chul Paik, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1245 days.

(21) Appl. No.: 11/165,033

(22) Filed: Jun. 24, 2005

(65) Prior Publication Data

US 2006/0020981 A1    Jan. 26, 2006

(30) Foreign Application Priority Data

Jul. 22, 2004    (KR)    ...................... 10-2004-0057039

(51) Int. Cl.
- H04N 5/63 (2006.01)
- H04N 5/50 (2006.01)
- H04N 5/58 (2006.01)

(52) U.S. Cl. .................. 348/730; 348/569; 348/602

(58) Field of Classification Search ......... 348/723–726, 348/730, 790–793, 602, 603, 658, 687, 569, 348/563; 345/87, 102; H04N 5/38, 5/40, H04N 5/44, 5/455, 5/63, 3/14, 5/58, 5/57, H04N 5/50, 5/445

See application file for complete search history.

(56) References Cited

U.S. PATENT DOCUMENTS 7,227,595 B2 *  6/2007  Kita ........................... 348/790

FOREIGN PATENT DOCUMENTS

| JP | 11-215247 A | 8/1999 |
|---|---|---|
| JP | 2002-157054 A | 5/2002 |
| JP | 2002354495 A | 12/2002 |
| KR | 1999-0034118 U | 8/1999 |
| KR | 2001-0061769 A | 7/2001 |
| KR | 2002005937 A * | 1/2002 |
| KR | 2002-0034479 A | 5/2002 |
| KR | 10-2004-0005272 A | 1/2004 |
| KR | 10-2004-0014794 A | 2/2004 |
| KR | 10-2004-0019215 A | 3/2004 |

OTHER PUBLICATIONS

Lorch, J.R. et al. "Software Strategies for Portable Computer Energy Management". IEEE Personal Communications, IEEE Communications Society, US. pp. 60-73; XP 000765376.

* cited by examiner

Primary Examiner—Sherrie Hsia  
(74) Attorney, Agent, or Firm—Sughrue Mion, PLLC

(57) ABSTRACT

A wireless TV system includes a base station including a wireless signal processor to process a predetermined video signal into a wireless signal, and a transmitter to transmit the wireless signal from the wireless signal processor; and a wireless TV comprising a receiver to receive the wireless signal from the transmitter, an LCD displaying a picture based on the wireless signal, a backlight unit to illuminate the LCD, a battery to supply power, an inverter to supply the power from the battery to the backlight unit, and a controller to determine whether a wireless communication state is normal or abnormal based on the received wireless signal and to control the inverter to lower a brightness level of the LCD into a predetermined brightness level when the wireless communication state is abnormal.

19 Claims, 2 Drawing Sheets

WIRELESS TV SYSTEM AND CONTROL METHOD THEREOF

CROSS-REFERENCE TO RELATED APPLICATIONS

This application claims the benefit of Korean Patent Application No. 2004-0057039, filed on Jul. 22, 2004, in the Korean Intellectual Property Office, the disclosure of which is incorporated herein by reference.

BACKGROUND OF THE INVENTION

1. Field of the Invention

The present invention relates to a wireless television (TV) system, and more particularly, to a wireless TV system and a control method thereof, in which wasteful power consumption is reduced.

2. Description of the Related Art

Recently, use of various wireless appliances has increased as technology has developed and information technology has accelerated. As one of the wireless appliances, a wireless TV system generally comprises a base station processing a broadcast signal received through an antenna or a predetermined video signal received through a predetermined video cable, and outputting a wireless signal; and a wireless TV receiving the wireless signal from the base station, and processing the wireless signal to be displayed on a liquid crystal display (LCD).

In such a wireless TV system, wireless communication is interactively achieved between the base station and the wireless TV. That is, when a user wants to watch TV and selects a broadcast channel while carrying the wireless TV, the base station wirelessly transmits a video signal corresponding to the broadcast channel selected by the wireless TV, and the wireless TV receives the video signal through wireless communication and displays it on the LCD.

In the conventional wireless TV system, the wireless communication between the base station and the wireless TV may not go smoothly, or the base station may not transmit the requested video signal to the wireless TV even though there is no problem in the wireless communication.

However, even if the wireless communication does not go smoothly or even if there is no problem in the wireless communication but the base station does not transmit the requested video signal to the wireless TV, the wireless TV still normally operates to display a picture based on the video signal onto the LCD, thereby wastefully consuming limited power of a battery.

SUMMARY OF THE INVENTION

Accordingly, it is an aspect of the present invention to provide a wireless TV system and a control method thereof, in which wasteful power consumption is reduced.

The foregoing and/or other aspects of the present invention are also achieved by providing a wireless TV system comprising a base station comprising a wireless signal processor to process a predetermined video signal into a wireless signal, and a transmitter to transmit the wireless signal from the wireless signal processor; and a wireless TV comprising a receiver to receive the wireless signal from the transmitter, an LCD displaying a picture based on the wireless signal, a backlight unit to illuminate the LCD, a battery to supply power, an inverter to supply the power from the battery to the backlight unit, and a controller to determine whether a wireless communication state is normal or abnormal on the basis of the received wireless signal, and to control the inverter to lower a brightness level of the LCD into a predetermined brightness level when the wireless communication state is abnormal.

According to another aspect of the present invention, the base station further comprises a tuner to select a broadcast signal, and a video signal connector connected with a video cable through which a predetermined video signal is transmitted, and the base station receives the video signal through the tuner and the video signal connector, and the wireless TV further comprises an on-screen display (OSD) generator to generate a power saving mode OSD message, wherein the controller controls the OSD generator to display the power saving mode OSD message on the LCD and at the same time controls the inverter to lower the brightness level of the LCD into the predetermined brightness level when the wireless communication state is abnormal.

According to yet another aspect of the present invention, the controller determines the wireless communication state on the basis of the received wireless signal, and controls the OSD generator to display the power saving mode OSD message on the LCD and the inverter to lower the brightness level of the LCD into the predetermined brightness level when the wireless communication state is abnormal for a predetermined period of time.

According to yet another aspect of the present invention, the base station processes a predetermined video signal corresponding to a request wireless signal transmitted from the wireless TV into the wireless signal and transmits the wireless signal to the wireless TV, and the wireless TV further comprises a control panel for a user key input, wherein the controller transmits the request wireless signal to request the video signal corresponding to a predetermined video mode when the video mode is selected by the user key input through the control panel; determines whether the request video signal is received on the basis of the request wireless signal received from the base station; and controls the inverter to lower the brightness level of the LCD into the predetermined brightness level and the OSD generator to display the power saving mode OSD message on the LCD when the requested video signal is not received.

The foregoing and/or other aspects of the present invention are also achieved by providing a method of controlling a wireless TV system comprising a base station comprising a wireless signal processor to process a predetermined video signal into a wireless signal, and a transmitter to transmit the wireless signal from the wireless signal processor; and a wireless TV comprising an LCD displaying a picture based on the wireless signal received from the base station, the method comprising: allowing the wireless TV to determine whether a wireless communication state is normal or abnormal on the basis of the wireless signal; and allowing the wireless TV to lower a brightness level of the LCD into a predetermined brightness level when the wireless communication state is abnormal.

According to yet another aspect of the present invention, the method further comprises providing the wireless TV with an OSD generator; and controlling the OSD generator to display a power saving mode OSD message on the LCD when the wireless communication state is abnormal.

According to yet another aspect of the present invention, the method further comprises determining whether the wireless communication state is abnormal for a period of time when the wireless communication state is abnormal; and displaying the power saving mode OSD message on the LCD and lowering the brightness level of the LCD into the predetermined brightness level when the wireless communication state is abnormal for a period of time.

According to yet another aspect of the present invention, a wireless TV system comprises: a base station comprising a wireless signal processor to process a predetermined video signal into a wireless signal, and a transmitter to transmit the wireless signal from the wireless signal processor; and a wireless TV comprising a receiver to receive the wireless signal from the transmitter, a display displaying a picture based on the wireless signal, and a controller to determine whether a wireless communication state is one of normal and abnormal based on the received wireless signal and to control the lowering of the brightness level of the display when the wireless communication state is abnormal.

According to yet another aspect of the present invention, a wireless TV comprises: a receiver receiving a wireless signal; a display displaying a picture based on the wireless signal; and a controller determining whether a wireless communication state is one of normal and abnormal based on the received wireless signal and controlling a brightness level of the display when the wireless communication state is abnormal.

BRIEF DESCRIPTION OF THE DRAWINGS

The above and/or other aspects and advantages of the present invention will become apparent and more readily appreciated from the following description of the embodiments, taken in conjunction with the accompanying drawings of which.

DETAILED DESCRIPTION OF THE EXEMPLARY EMBODIMENTS

Figure 1:
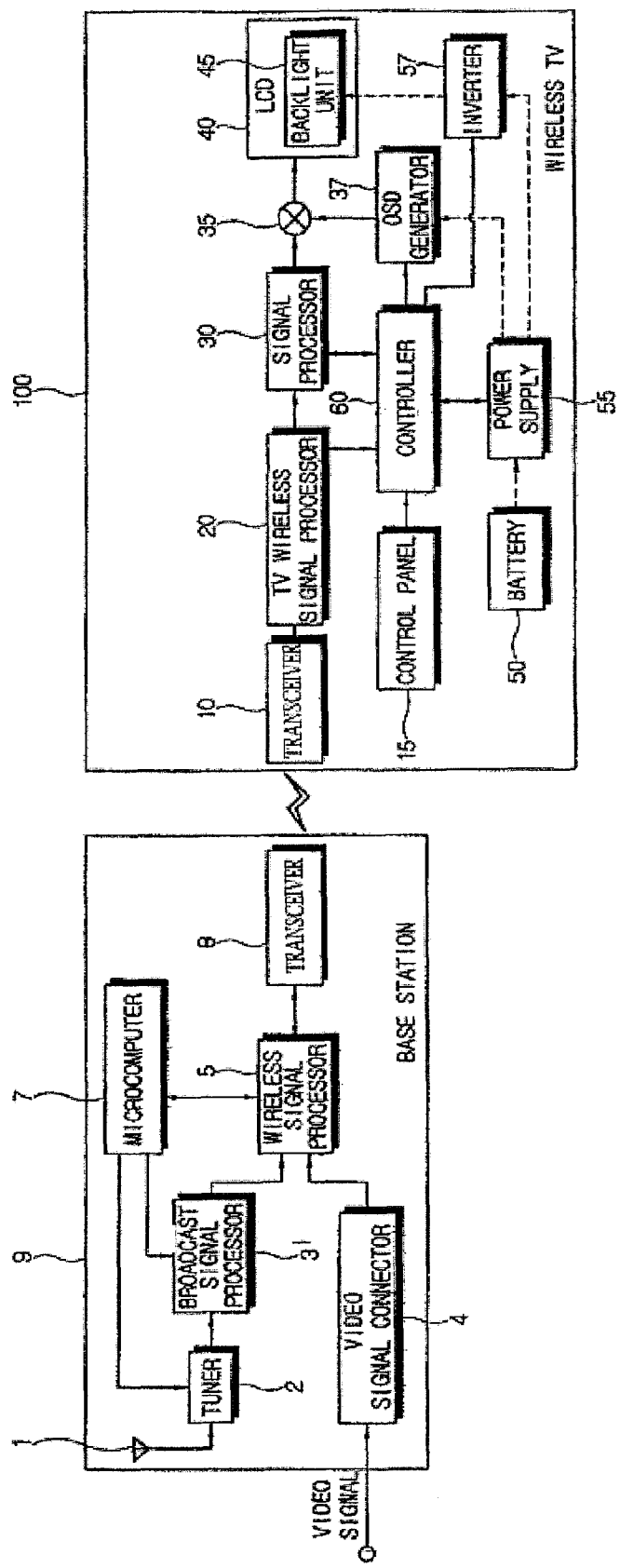
FIG. 1 is a control block diagram of a wireless TV system according to an embodiment of the present invention.

Reference will now be made in detail to the embodiments of the present invention, examples of which are illustrated in the accompanying drawings, wherein like reference numerals refer to like elements throughout. The embodiments are described below in order to explain the present invention by referring to the figures.

FIG. 1 is a control block diagram of a wireless TV system according to an embodiment of the present invention. As shown therein, a wireless TV system according to an embodiment of the present invention comprises a base station 9 processing a broadcast signal received through an antenna 1 or a predetermined video signal received through a video signal connector 4 to which a predetermined video cable is connected, and outputting a wireless signal; and a wireless TV 100 receiving the wireless signal from the base station 9, and processing the wireless signal to be displayed on an LCD 40.

The base station 9 comprises the antenna 1 to receive the broadcast signal; a tuner 2 to select the broadcast signal received through the antenna 1; a broadcast signal processor 3 to amplify an intermediate frequency signal selected by the tuner 2 into a video signal; the video signal connector 4 connected with the video cable and receiving a predetermined video signal through the video cable; a wireless signal processor 5 to process the video signals received from either the broadcast signal processor 3 or the video signal connector 4 into the wireless signal and to process a predetermined request wireless signal into a control signal; a transceiver 6 to transmit the wireless signal from the wireless signal processor 5 to the outside, and to receive the request wireless signal and transmit it to the wireless signal processor 5; and a microcomputer 7 to control the tuner 2, the broadcast signal processor 3 and the wireless signal processor 5 to process the video signal requested by the wireless TV 100 into the wireless signal so as to transmit it to the outside, based on the control signal received from the wireless signal processor 5.

The wireless TV 100 comprises a transceiver 10 to receive the wireless signal from the base station 9 and to send the request signal to the base station 9, a TV wireless signal processor 20 to process a predetermined control signal into the wireless request signal so as to transmit it to the outside through the transceiver 10 and to process the wireless signal from the base station 9 into the video signal; a signal processor 30 to process the video signal from the TV wireless signal processor 20 into a displayable video signal; an on-screen display (OSD) generator 37 to generate a power saving mode OSD message; a mixer 35 to mix the video signal from the signal processor 30 and an OSD signal from the OSD generator 37 so as to output a predetermined video signal; a backlight unit 45 to adjust a brightness of a picture; and the LCD 40 to display the picture based on the video signal outputted from the mixer 35.

Further, the wireless TV 100 comprises a battery 50 to supply power; a power supply 55 converting the power supplied from the battery 50 to have a voltage for driving components of the wireless TV 100; an inverter 57 to supply the power from the power supply 55 to the backlight unit 45; and a control panel 15 having a plurality of keys allowing a user to control the wireless TV 100. Also, the wireless TV 100 comprises a controller 60 for transmitting the request wireless signal to request the video signal corresponding to a predetermined video mode to the base station 9 when the video mode is selected through the control panel 15, controlling the TV wireless signal processor 20 and the signal processor 30 to receive the wireless signal from the base station 9 through the transceiver 10 and to process the wireless signal to be displayed as a picture on the LCD 40, determining a wireless communication state on the basis of the received wireless signal, and controlling the inverter 57 to lower the brightness level of the LCD 40 into a predetermined brightness level when the wireless communication state is abnormal.

The OSD generator 37 generates the power saving mode OSD message as an OSD window to visually inform a user that the brightness level of the LCD 40 is lowered by the controller 60 into a predetermined brightness level.

The inverter 57 converts DC power received from the power supply 55 into AC power for driving the backlight unit 45 of the LCD 40.

The controller 60 outputs a control signal for requesting a video signal corresponding to a predetermined video mode when the video mode is selected through the control panel 15, thereby controlling the TV wireless signal processor 20 to send the request wireless signal to the base station 9 on the basis of the control signal. Further, the controller 60 controls the TV wireless signal processor 20, the signal processor 30, the power supply 55 and the inverter 57 to receive and process the wireless signal from the base station 9 through the transceiver 10 and to display a picture based on the wireless signal onto the LCD 40 having normal brightness.

Further, the controller 60 determines the wireless communication state on the basis of signal information from the TV wireless signal processor 20 processing the wireless signal received through the transceiver 10 into the video signal. When the wireless communication state is abnormal for a predetermined period of time, the controller 60 controls the OSD generator 37 to generate the power saving mode OSD message as the OSD window, and controls the inverter 57 to lower the brightness level of the LCD 40 into a predetermined brightness level. Here, the controller 60 determines the wireless communication state on the basis of the signal information from the TV wireless signal processor 20, and determines whether the request video signal is received or not in the case of the normal wireless communication state. When the request video signal is not received, the controller 60 controls the OSD generator 37 to generate the power saving mode OSD message as the OSD window, and controls the inverter 57 to lower the brightness level of the LCD 40 into a predetermined brightness level.

Here, the foregoing predetermined brightness level of the LCD 40 is the minimum brightness level of the LCD 40 among the brightness levels adjustable through the inverter 57 that enables a user to recognize the power saving mode OSD message.

Here, the wireless TV 100 transmits the request wireless signal corresponding to the video mode selected through the control panel 15, e.g., transmits the request wireless signal for a VCR video signal corresponding to a video cassette recorder (VCR) mode when the VCR mode is selected through the control panel 15, to the base station 9. Then, the base station 9 processes the VCR video signal inputted through the video signal connector 4 into the wireless signal and transmits the wireless signal to the wireless TV 100, so that the wireless TV displays a picture based on the wireless signal. On the other hand, the request video signal may be not transmitted to the wireless TV 100 when the VCR video signal inputted through the video signal connector 4 of the base station 9 has an abnormal vertical or horizontal synchronous signal, or when the video cable is not correctly connected to the video signal connector 4. That is, there is no problem in the wireless communication between the wireless TV 100 and the base station 9, but the base station 9 cannot transmit the video signal requested by the wireless TV to the wireless TV.

Alternatively, the wireless TV may comprise a connector (not shown) like the video signal connector 4 connected with the vide cable and transmitting a predetermined video signal therethrough. Thus, the wireless TV can directly receive a predetermined video signal and display a picture based on the received video signal.

In the case where a predetermined video mode is selected through the control panel 15, e.g., in the case where the VCR mode is selected through the control panel 15, it is determined that the wireless TV cannot receive the request video signal when the VCR video signal inputted through the connector (not shown) provided in the wireless TV 100 has an abnormal vertical or horizontal synchronous signal, or when the video cable is not correctly connected to the connector provided in the wireless TV. At this time, the controller 60 controls the OSD generator 37 to generate the power saving mode OSD message as the OSD window, and the inverter 57 to lower the brightness level of the LCD 40 into a predetermined brightness level.

Figure 2:
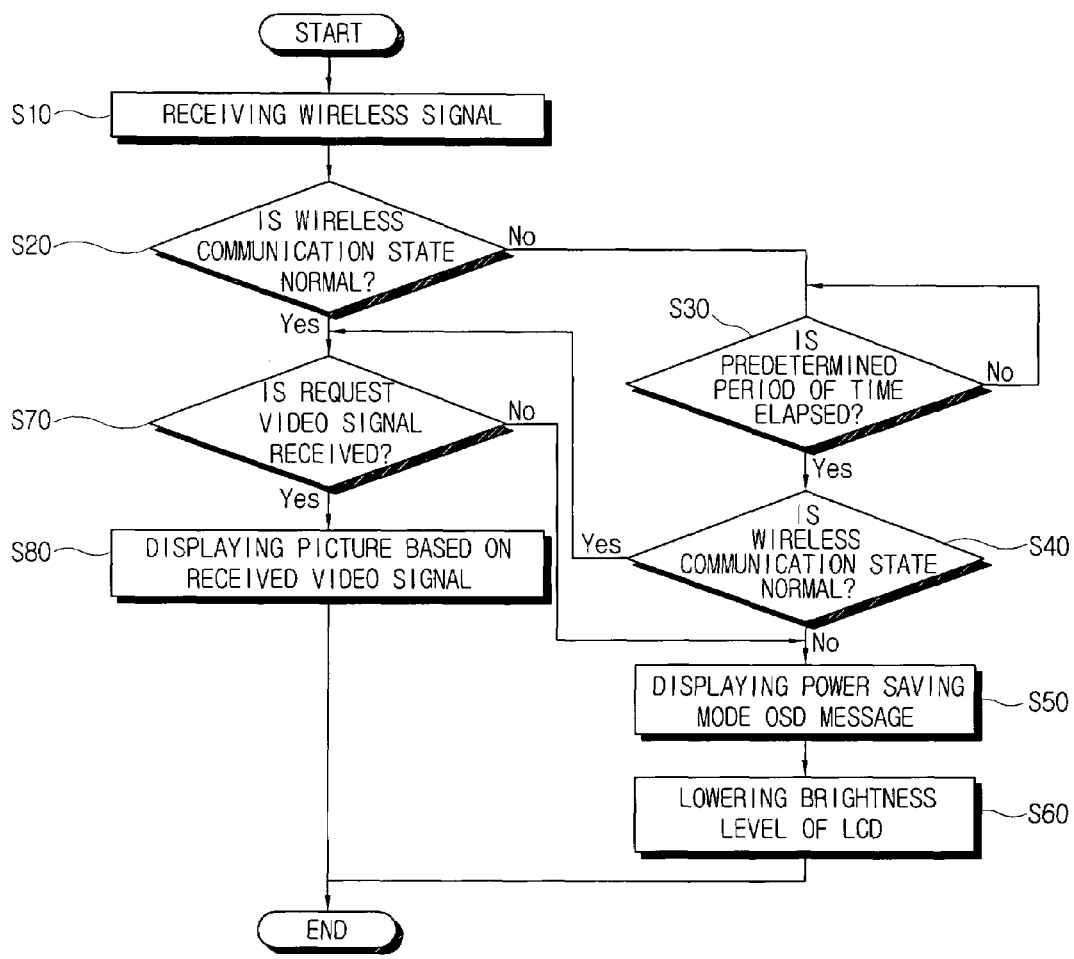
FIG. 2 is a control flowchart of the wireless TV system according to an embodiment of the present invention.

With this configuration, operations of the wireless TV system according to an embodiment of the present invention will be described hereinbelow with respect to FIG. 2. At operation S10, a predetermined video mode is selected through the control panel 15 of the wireless TV 100, and the wireless TV 100 transmits the request wireless signal to the base station 9 and receives the wireless signal corresponding to the request wireless signal from the base station 9. At operation S20, the controller 60 determines whether the wireless communication state is normal or abnormal on the basis of the signal information of the received wireless signal. When the wireless communication state is abnormal, at operation S30, the controller 60 determines whether a predetermined period of time is elapsed after the wireless communication state becomes abnormal. When the predetermined period of time is elapsed, at operation S40, the controller 60 determines whether the wireless communication state is still abnormal. When the wireless communication state is still abnormal, at operation S50, the controller 60 controls the OSD generator 37 to generate the power saving mode OSD message, and at operation S60, the controller 60 controls the inverter 57 to lower the brightness level of the LCD 40 into a predetermined brightness level. On the other hand, when the wireless communication state is normal, at operation S70, the controller determines whether the wireless TV 100 receives the wireless signal corresponding to the request wireless signal on the basis of the signal information of the wireless signal. When the wireless TV 100 does not receive the video signal corresponding to the request wireless signal, the controller 60 controls the wireless TV 100 to operate by returning to the operation S50. When the wireless TV 100 receives the video signal corresponding to the request wires signal, at operation S80, the controller 60 controls the brightness level of the LCD 40 to be kept at a normal brightness level.

In the above-described embodiment, the present invention is applied to the wireless TV 100, but is not limited to and may be applied to various appliances such as a mobile phone comprising an LCD. In this case, a brightness level of the LCD in the mobile phone is adjustable according to wireless communication states, thereby reducing wasteful power consumption. Also, the present invention is not limited to an LCD but relates to other types of displays as well.

Thus, in the wireless TV system according to an embodiment of the present invention, when the wireless communication between the base station 9 and the wireless TV 100 does not go smoothly, or when the base station 9 does not transmit the video signal requested by the wireless TV 100 to the wireless TV 100, the brightness level of the LCD 40 is lowered into a predetermined brightness level, thereby reducing the wasteful power consumption.

As described above, the present invention provides a wireless TV system and a control method thereof, in which wasteful power consumption is reduced.

Although a few embodiments of the present invention have been shown and described, it will be appreciated by those skilled in the art that changes may be made in these embodiments without departing from the principles and spirit of the invention, the scope of which is defined in the appended claims and their equivalents.

What is clamed is:

1. A wireless TV system comprising:
a base station comprising a wireless signal processor to process a predetermined video signal into a wireless signal, and a transmitter to transmit the wireless signal from the wireless signal processor; and
a wireless TV comprising a receiver to receive the wireless signal from the transmitter, a liquid crystal display (LCD) displaying a picture based on the wireless signal, a backlight unit to illuminate the LCD, a battery to supply power, an inverter to supply the power from the battery to the backlight unit, and a controller to determine whether a wireless communication state is one of normal and abnormal based on the received wireless signal and to control the inverter to lower a brightness level of the LCD to a predetermined brightness level when the wireless communication state is abnormal,
wherein the controller determines the wireless communication state based on the received wireless signal, and controls an OSD generator to display a power saving mode OSD message on the LCD and the inverter to lower the brightness level of the LCD to the predetermined brightness level when the wireless communication state is abnormal for a predetermined period of time.

2. The wireless TV system according to claim 1, wherein the base station processes a predetermined video signal corresponding to a request wireless signal transmitted from the wireless TV into the wireless signal and transmits the wireless signal to the wireless TV, and the wireless TV further comprises a control panel for a user key input, wherein the controller transmits the request wireless signal to request the video signal corresponding to a predetermined video mode when the video mode is selected by the user key input through the control panel; determines whether the request video signal is received based on the request wireless signal received from the base station; and controls the inverter to lower the brightness level of the LCD into the predetermined brightness level and the OSD generator to display the power saving mode OSD message on the LCD when the request video signal is not received.

3. A wireless TV system comprising:

a base station comprising a wireless signal processor to process a predetermined video signal into a wireless signal, and a transmitter to transmit the wireless signal from the wireless signal processor; and a wireless TV comprising a receiver to receive the wireless signal from the transmitter, a liquid crystal display (LCD) displaying a picture based on the wireless signal, a backlight unit to illuminate the LCD, a battery to supply power, an inverter to supply the power from the battery to the backlight unit, and a controller to determine whether a wireless communication state is one of normal and abnormal based on the received wireless signal and to control the inverter to lower a brightness level of the LCD to a predetermined brightness level when the wireless communication state is abnormal, wherein the base station further comprises a tuner to select a broadcast signal, and a video signal connector connected with a video cable through which a predetermined video signal is transmitted, and receives the video signal through the tuner and the video signal connector, and the wireless TV further comprises an on-screen display (OSD) generator to generate a power saving mode OSD message, wherein the controller controls the OSD generator to display the power saving mode OSD message on the LCD and at the same time controls the inverter to lower the brightness level of the LCD into the predetermined brightness level when the wireless communication state is abnormal.

4. The wireless TV system according to claim 3, wherein the controller determines the wireless communication state based on the received wireless signal, and controls the OSD generator to display the power saving mode OSD message on the LCD and the inverter to lower the brightness level of the LCD into the predetermined brightness level when the wireless communication state is abnormal for a predetermined period of time.

5. The wireless TV system according to claim 4, wherein the base station processes a predetermined video signal corresponding to a request wireless signal transmitted from the wireless TV into the wireless signal and transmits the wireless signal to the wireless TV, and the wireless TV further comprises a control panel for a user key input, wherein the controller transmits the request wireless signal to request the video signal corresponding to a predetermined video mode when the video mode is selected by the user key input through the control panel; determines whether the request video signal is received based on the request wireless signal received from the base station; and controls the inverter to lower the brightness level of the LCD into the predetermined brightness level and the OSD generator to display the power saving mode OSD message on the LCD when the request video signal is not received.

6. A method of controlling a wireless TV system comprising a base station comprising a wireless signal processor to process a predetermined video signal into a wireless signal, and a transmitter to transmit the wireless signal from the wireless signal processor; and a wireless TV comprising a display displaying a picture based on the wireless signal received from the base station, the method comprising:

at the wireless TV, determining whether a wireless communication state is one of normal and abnormal based on the wireless signal;

at the wireless TV, lowering a brightness level of the display to a predetermined brightness level when the wireless communication state is determined to be abnormal; and determining whether the wireless communication state is abnormal for a period of time, when the wireless communication state is determined to be abnormal; and displaying a power saving mode OSD message on the display and lowering the brightness level of the display to the predetermined brightness level when the wireless communication state is abnormal for the period of time.

7. The method according to claim 6, wherein said display is a liquid crystal display (LCD).

8. A method of controlling a wireless TV system comprising a base station comprising a wireless signal processor to process a predetermined video signal into a wireless signal, and a transmitter to transmit the wireless signal from the wireless signal processor; and a wireless TV comprising a display displaying a picture based on the wireless signal received from the base station, the method comprising:

at the wireless TV, determining whether a wireless communication state is one of normal and abnormal based on the wireless signal; and at the wireless TV, lowering a brightness level of the display to a predetermined brightness level when the wireless communication state is determined to be abnormal, wherein said wireless TV is provided with an on-screen display (OSD) generator, and said method further comprising:

controlling the OSD generator to display a power saving mode OSD message on the display when the wireless communication state is abnormal.

9. The method according to claim 8, further comprising:

determining whether the wireless communication state is abnormal for a period of time when the wireless communication state is determined to be abnormal; and displaying the power saving mode OSD message on the display and lowering the brightness level of the display into the predetermined brightness level when the wireless communication state is abnormal for the period of time.

10. A wireless display system comprising:

a base station that receives video signal, processes the video signal into a wireless signal, and transmits the wireless signal; and a display that receives the wireless signal from the base station, determines whether a communication state between the base station and the display is one of normal and abnormal based on the received wireless signal, and lowers a brightness level of the display and displays a power saving mode message on the display when the wireless communication state is abnormal.

11. The system according to claim 10, wherein said lowering of the brightness level of the display comprises lowering the brightness level of the display to a predetermined brightness level that is a minimum brightness level of the display at which a user is able to recognize the power saving mode message on the display.

12. The system according to claim 10, wherein said power saving mode message is an on-screen display (OSD) message generated by an OSD generator.

13. A wireless display of a wireless display system comprising:
 a receiver that receives a wireless signal from a base station of the system;
 a display that displays a picture based on the received wireless signal; and
 a controller that determines whether a wireless communication state between the display and the base station is one of normal and abnormal based on the received wireless signal and lowers a brightness level of the display and displays a power saving mode message on the display when the wireless communication state is abnormal.

14. The display according to claim 13, wherein said lowering of the brightness level comprises lowering the brightness level of the display to a predetermined brightness level that is a minimum brightness level of the display at which a user is able to recognize the power saving mode message on the display.

15. The display according to claim 13, wherein said display is a liquid crystal display (LCD).

16. The display according to claim 13, wherein said power saving mode message is an on-screen display (OSD) message generated by an OSD generator.

17. A method of controlling a wireless display, the method comprising:
 determining, by the display, whether a wireless communication state between the display and a base station is one of normal and abnormal based on a wireless signal received by the display from the base station;
 lowering a brightness level of the display to a predetermined brightness level and displaying a power saving mode message on the display when the wireless communication state is determined to be abnormal.

18. The method of claim 17, wherein the predetermined brightness level is a minimum brightness level of the display at which a user is able to recognize the power saving mode message on the display.

19. The method of claim 17, wherein said power saving mode message is an on-screen display (OSD) message generated by an OSD generator.

* * * * *